United States Patent [19]

Yavorsky et al.

[11] Patent Number: 4,740,262

[45] Date of Patent: Apr. 26, 1988

[54] METHOD OF MANUFACTURING A PRESSURE VESSEL WITH AN IMPROVED SIDEWALL STRUCTURE

[75] Inventors: William M. Yavorsky, Woodbury; Gary W. Gauer, Cottage Grove, both of Minn.

[73] Assignee: Ecodyne Corporation, St. Paul, Minn.

[21] Appl. No.: 885,299

[22] Filed: Jul. 14, 1986

Related U.S. Application Data

[63] Continuation-in-part of Ser. No. 822,921, Jan. 24, 1986, Pat. No. 4,619,374, and a continuation of Ser. No. 612,239, May 21, 1984, abandoned, which is a continuation-in-part of Ser. No. 447,769, Jan. 24, 1983, abandoned.

[51] Int. Cl.⁴ .................. B29C 65/00; B29C 65/54; B32B 31/00
[52] U.S. Cl. .................................... 156/293; 156/172; 156/175; 156/253; 156/303.1; 264/248; 264/255
[58] Field of Search .................. 220/1 B, 3, 414, 459, 220/468, 453, 83; 264/512, 514, 515, 541, 248, 255; 156/120–123, 175, 425, 294, 299, 303.1, 169, 253, 293; 138/109

[56] References Cited

U.S. PATENT DOCUMENTS

| | | | |
|---|---|---|---|
| 868,548 | 10/1907 | Griffin . | |
| 1,855,077 | 4/1932 | Wildt | 220/459 |
| 1,862,153 | 6/1932 | Lee | 285/231 |
| 2,273,736 | 2/1942 | Raymond et al. | 29/148.2 |
| 2,281,407 | 4/1942 | Bohnsack | 29/148.2 |
| 2,402,781 | 6/1946 | Schreiber | 284/4 |
| 2,666,007 | 1/1954 | Hovey | 156/253 |
| 2,688,488 | 9/1954 | Crowley | 156/172 |
| 2,848,133 | 8/1958 | Ramberg | 156/184 |
| 3,106,940 | 10/1963 | Young | 156/253 |
| 3,112,234 | 11/1963 | Krupp | 156/173 |
| 3,137,898 | 6/1964 | Geringer | 156/196 |
| 3,280,567 | 10/1966 | Elliott et al. | 156/173 |
| 3,293,860 | 12/1966 | Stedfeld | 156/173 |
| 3,394,738 | 7/1968 | Baron et al. | 220/83 |
| 3,508,677 | 4/1970 | Laibson | 220/3 |
| 3,587,904 | 6/1971 | Harris | 220/3 |
| 3,653,846 | 4/1972 | Kubec et al. | 23/289 |
| 3,662,780 | 5/1972 | Marsh | 137/590 |
| 3,847,716 | 11/1974 | Dorsch | 220/414 |
| 3,866,292 | 2/1975 | Minke | 156/175 |
| 3,874,544 | 4/1975 | Harmon | 220/3 |
| 3,907,149 | 9/1975 | Harmon | 220/3 |
| 4,191,304 | 4/1980 | Schiedat | 220/414 |
| 4,369,894 | 1/1983 | Grover et al. | 220/83 |
| 4,614,279 | 9/1986 | Toth et al. | 230/3 |

*Primary Examiner*—Merrell C. Cashion, Jr.
*Attorney, Agent, or Firm*—Neuman, Williams, Anderson & Olson

[57] ABSTRACT

A method is provided for constructing a thinwall pressure vessel having a thermoplastic inner liner, a filament wound outer shell and at least one localized area of increased thickness in its sidewall. The method includes providing an insert formed from thermoplastic material or other suitable material which is bondable with the material of the inner liner. The manufacturer uses this insert to form a localized area of increased thickness in the sidewall of the pressure vessel. First, the manufacturer blow molds or otherwise forms a thermoplastic inner liner and bonds the insert to the inner liner. The manufacturer then provides a means for locating or finding the port of the insert and constructs the outer shell with glass filaments impregnated with a resinous material or other suitable material. Then, after locating the insert, the maker forms an opening which extends through the entire sidewall of the pressure vessel.

19 Claims, 2 Drawing Sheets

FIG. 1
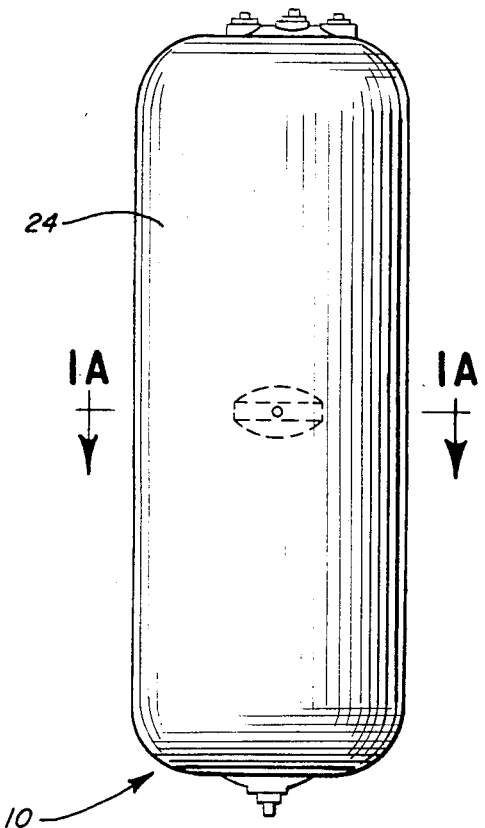
FIG. 1C
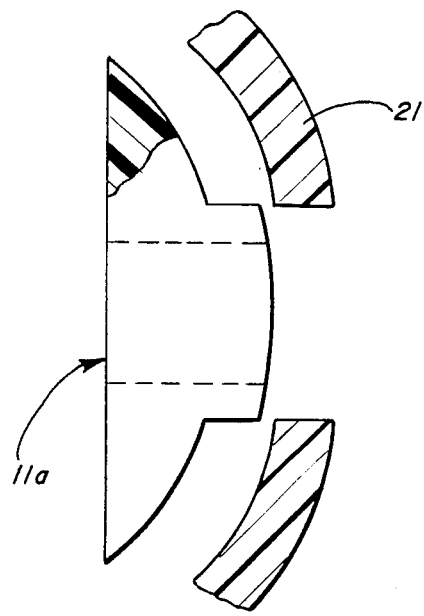
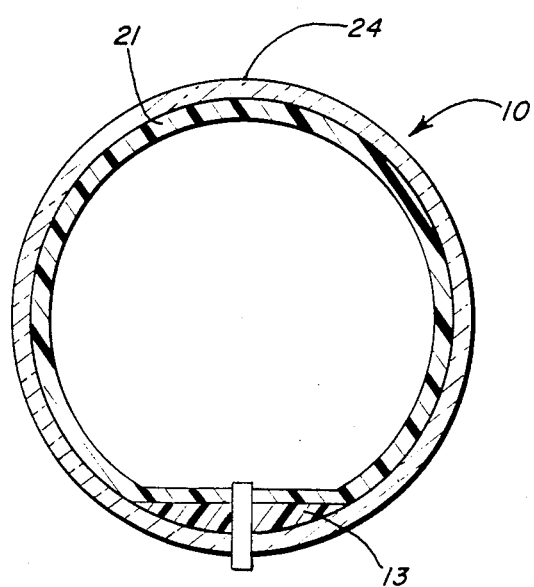
FIG. 1A
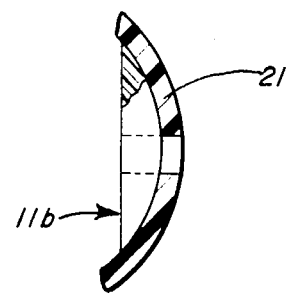
FIG. 1D

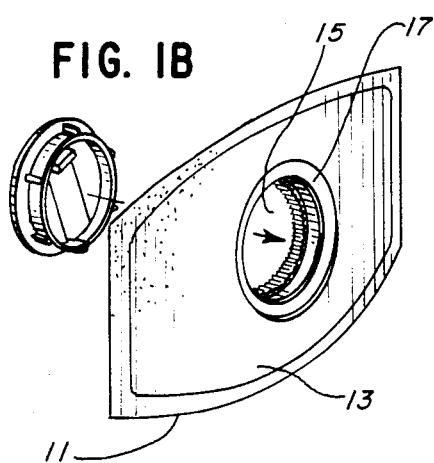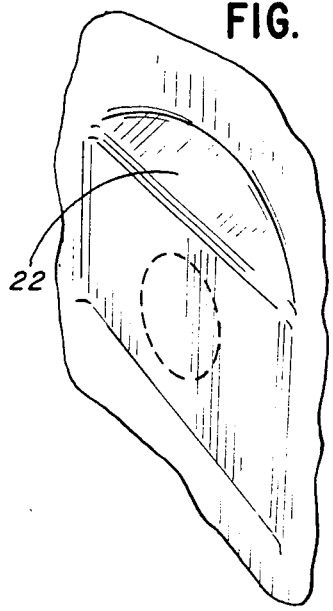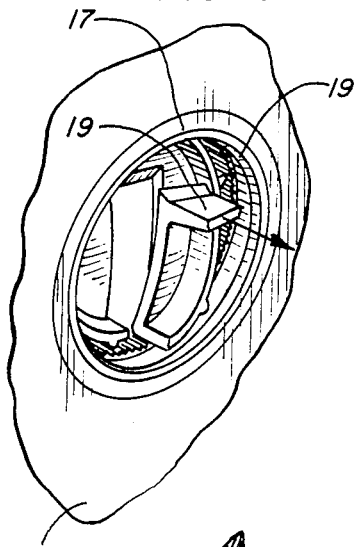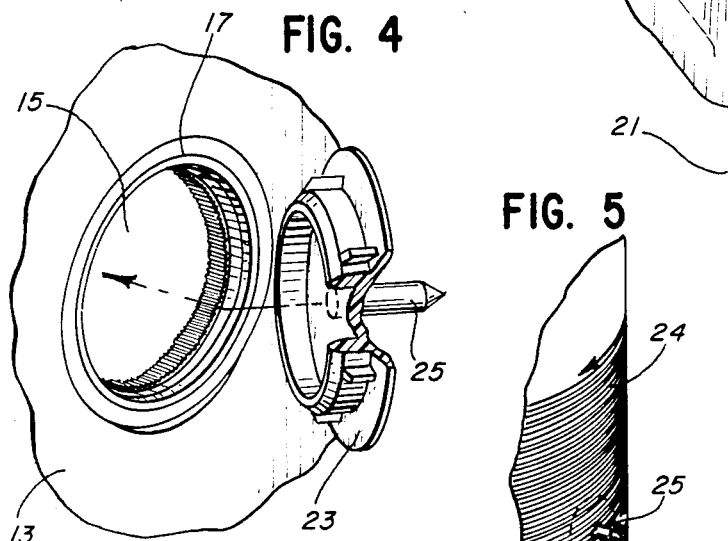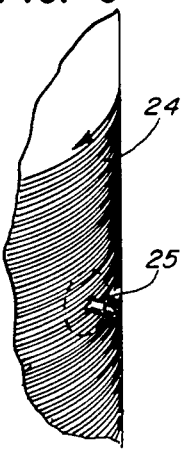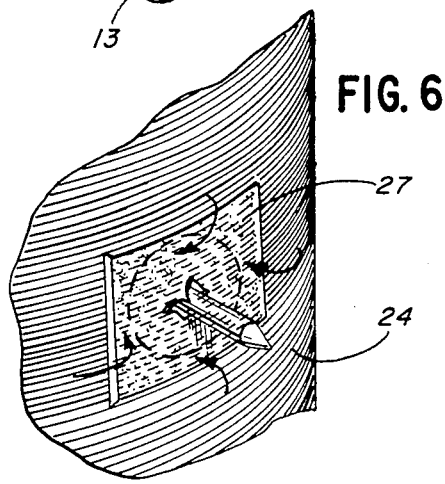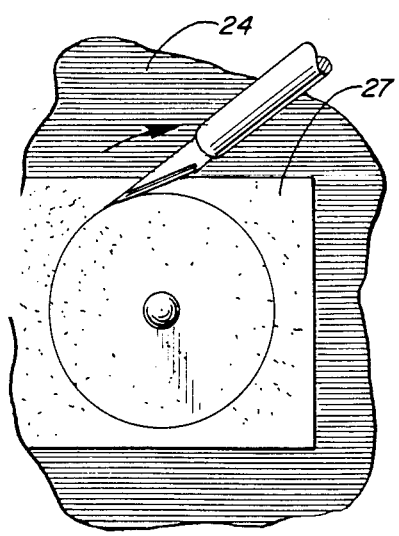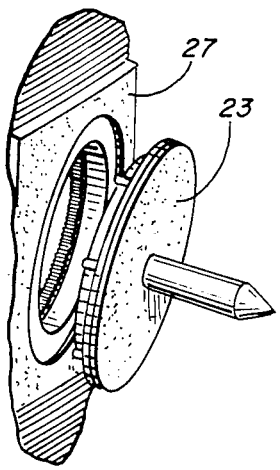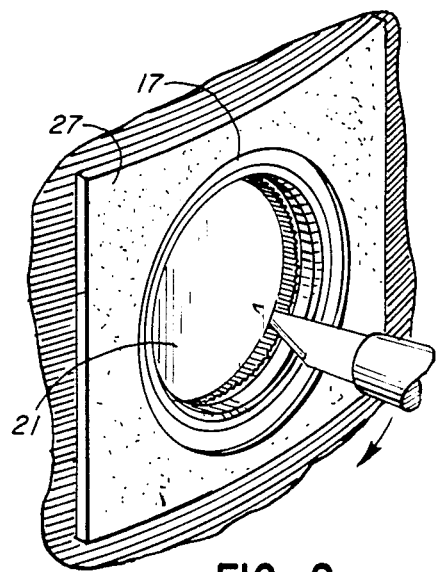

METHOD OF MANUFACTURING A PRESSURE VESSEL WITH AN IMPROVED SIDEWALL STRUCTURE

BACKGROUND OF THE INVENTION

This application is a continuation in part of application Ser. No. 822,921, filed Jan. 24, 1986, for a "Pressure Vessel With An Improved Sidewall Structure", now U.S. Pat. No. 4,619,374. Application Ser. No. 822,921, now U.S. Pat. No. 4,619,374, is a continuation of application Ser. No. 612,239, filed May 21, 1984, now abandoned, which is a continuation in part of application Ser. No. 447,769, filed Jan. 24, 1983 for a "Plastic Shell Construction For A Pressure Tank And Method For Manufacturing Same", now abandoned.

FIELD OF THE INVENTION

The present invention relates to a method of constructing a thin-walled pressure vessel with an improved sidewall structure, and more particularly, to a method of constructing a pressure vessel by using at least one insert which forms a localized area of increased thickness in the sidewall of the vessel and defines a leak-proof port.

DESCRIPTION OF THE PRIOR ART

Most prior art pressure vessels used to contain various corrosive and noncorrosive fluids at high pressures and temperatures are massive metal structures. Since these vessels have thick and heavy metal sidewall structures, they can easily accommodate ports that adequately support various fittings without leakage. However, the size and weight of these structures limits their use to commercial or heavy duty industrial applications. Frequently, their manufacture is difficult and expensive.

Other prior art pressure vessels which overcome the disadvantages of these massive metal vessels suffer from other disadvantages. These vessels have composite outer shells of continuously wound glass filaments impregnated with a thermosetting resinous material and inner liners made of plastic material. Their sidewalls are relatively thin and light, making them easy to handle and construct.

However, attempting to place a port in the sidewalls of such vessels presents significant and serious problems. First, the thin sidewalls do not have sufficient material thickness for a properly threaded bore and accordingly, cannot directly receive a threaded fitting. Any seal between a fitting and the annular surface of a port in the sidewall of such a vessel is weak and easily broken or cracked by even slight contact with the external portion of the fitting. Moreover, the sidewall itself is weak in the area of a port and may fracture or fail.

In the past, the manufacturers of thin-walled pressure vessels provided vessels having ports through only the top or bottom of the vessel. Some makers produce vessels with inner liners having metallic top and bottom portions so that any port formed through those metallic areas has sufficient strength to support a fitting. They place these caps at the ends of a cylindrical shell and connect them to the walls of the shell by interposing the edges of the caps between the shell's inner liner and outer composite layer. These methods are complex and costly, and they do not provide ports at a convenient location, namely, through the sidewall.

The method of the present invention avoids the problems outlined above. It allows the manufacturer of thin-walled pressure vessels to provide a vessel with a port through any location of its shell.

The method of the present invention includes forming an inner liner and bonding at least one insert to it for increasing the thickness of the vessel wall; placing a locating or indicating means at the insert; winding glass filaments impregnated with resin around the insert and a substantial portion of the inner liner to form the outer shell; placing at least one reinforcing patch within or over the filament winding at the area surrounding the indicating means; and cutting an opening through the reinforcing patch, the filaments of the outer shell and the inner liner at the location of the insert, identified by the indicating means, to form a port to the interior of the vessel.

SUMMARY OF THE INVENTION

Accordingly, it is a general object of the present invention to provide an improved method of manufacturing a thin-walled pressure vessel with a localized areas of increased wall thickness.

More particularly, it is an object of the present invention to provide a method for constructing a pressure vessel with an outer shell, thermoplastic inner liner, and at least one insert which provides an area of increased thickness in the sidewall of the pressure vessel so that the port in the sidewall can accommodate a fitting.

It is another object of the present invention to provide a method of manufacturing thin-walled pressure vessels with walls with at least one localized area of increased thickness which can accommodate a port and appropriate fitting.

Other objects, advantages, and features of the present invention will become apparent upon reading the following detailed description and appended claims and upon reference to the accompanying drawings.

In accordance with the preferred embodiment of the present invention, the applicants provide an improved method for constructing a thin-walled pressure vessel used to contain fluids at high pressures and temperatures. This method includes providing an insert having a thermoplastic body which defines a port through its center. The insert also has a fitting disposed in the port and secured to the walls of the port. Alternatively, the method can use an insert without a pre-formed port and/or without a pre-inserted fitting.

Generally, the method includes forming an inner liner and bonding at least one insert to it; placing an indicating or a locating means at the insert; winding glass filaments impregnated with resin substantially around the liner and the insert to form the outer shell; placing at least one reinforcing patch within or over the glass filaments at the location of the indicating means; and, cutting an opening through the reinforcing patch, the glass filaments of the outer shell and inner liner at the insert, identified by the indicating means, to form a port to the interior of the vessel.

Specifically, after construction of the insert, the maker of the vessel begins by forming the inner liner to define an enclosure having an elongate cylindrical middle portion and domed ends. In forming the inner liner, the maker may blow mold it against the insert so that the outer surface of the insert is flush with the curved outer surface of the cylindrical portion of the inner liner. Since the body of the insert is a thermoplastic material similar to the material used for the inner liner, the insert fuses with the inner liner to form an integral unit.

Alternatively, the maker may blow mold or otherwise form the inner liner with a recess or pocket which projects inward and receives the insert. With this procedure, the maker may bond the insert to the liner using adhesive or any other bonding means. Another alternative procedure for forming the inner liner and securing an insert to it includes constructing the inner liner by conventional blow molding or extruding methods. The subsequent steps of this alternative procedure include forming an opening in the liner at a predetermined location, placing an insert through the opening, and bonding the insert to the inner liner.

The next step of the process includes placing a finder element or location marker at the insert. Then, using the inner liner as a mandrel, the maker winds the glass filaments around the inner liner and the insert to form the outer shell. During or after the winding operation, the maker secures one or more reinforcing patches over the glass filaments, either within or over the outer shell, at the area of the port, identified by the location marker. The maker then cuts an opening through the outer filament wound shell and through the reinforcing patch. The reinforcing patch prevents the filament windings of the outer shell from unravelling away from the opening and distributes the force on cut filaments to uncut filaments. The maker then removes the location marker and cuts away a portion of the inner liner, thus, forming a port through the sidewall of the pressure vessel.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is an elevation view of the thin-walled pressure vessel which the method of the present invention provides.

FIG. 1A is a sectional view taken along line 1A—1A in FIG. 1.

FIG. 1B is perspective view of an insert which the manufacturer uses to provide an area of increased thickness in the sidewall of a thin-walled pressure vessel and a tear-away plug to seal the insert's port during construction of the vessel's shell.

FIG. 1C is a sectional view of the vessel's inner liner showing a modified insert.

FIG. 1D is a sectional view of the vessel's inner liner showing another modified insert.

FIG. 2 is a perspective view showing the inner surface of a portion of the inner liner in the area of the insert as it appears after its formation.

FIG. 3 is a perspective view showing the side of the inner liner opposite the side shown in FIG. 2 with the tear-away plug partially pulled out of the port.

FIG. 4 is a perspective view showing the insertion of a finder plug in the insert's port after removal of the tear-away plug.

FIG. 5 is a perspective view showing the construction of the outer shell which comprises winding glass filaments impregnated with a resinous material around the inner liner and insert.

FIG. 6 is a perspective view of the port area of the pressure vessel showing a securing patch adhered or otherwise secured to the pressure vessel at this area.

FIG. 7 is a plan view of the pressure vessel around the area of the port, showing the cutting of an opening through the composite outer shell.

FIG. 8 is a perspective view showing the removal of the finder plug from the insert's port.

FIG. 9 is a perspective view showing the cutting of the inner thermoplastic liner to form a port which extends through the outer shell, the insert and the inner liner.

While the following text and the drawings describe the invention in connection with a preferred embodiment and alternatives, one will understand that the invention is not limited to these embodiments.

DETAILED DESCRIPTION OF THE PREFERRED EMBODIMENT

The method of the present invention provides a thin-walled pressure vessel 10 having a thin thermoplastic inner liner wrapped by a filament wound outer shell and at least one localized area of increased thickness. This method generally comprises forming an inner liner and bonding at least one insert to it; winding glass filaments impregnated with resin or other suitable material around at least a substantial portion of the liner and the insert to form the outer shell; and, after locating the port of the insert and reinforcing the outer shell at the insert port, cutting an opening through the reinforced area of the outer shell and inner liner to form a port through the vessel.

Construction of the pressure vessel, according to the present invention, includes providing one or more of the inserts 11 shown in FIG. 1B. The insert 11 has a thermoplastic body 13 which defines an opening 15 through its center and a fitting 17 which is disposed in the opening 15 and secured to the walls of the opening to line the opening. It is also possible and within the scope of the present invention to use an insert without the prepositioned fitting and to insert the fitting at a later time, after construction of the vessel. The method also includes providing a tear-away plug 19 which seals the port 15 during the construction of the inner liner 21 as described below.

In constructing the inner liner 21, the maker secures the insert in place at a predetermined location and blow molds or otherwise forms the inner liner against the insert. Since the body of the insert is a thermoplastic material similar to the material used to construct the inner liner, the insert fuses with the inner liner to form an integral unit. This inner liner has the shape of the pressure vessel shown and described in pending U.S. patent application Ser. No. 822,921 whose description is incorporated herein by reference. The liner has an elongate cylindrical body and substantially hemispherical shaped top and bottom portions. However, the top and bottom portions need not have a hemispherical shape.

The maker of the vessel may form the thermoplastic inner liner 21 by blow molding or extruding the cylindrical middle portion of the liner and by blow molding or otherwise molding the domed ends. In extruding or otherwise forming the cylindrical tube portion of the inner liner, the maker forms a pocket or recess 22 having an appropriate shape and dimensions for receiving the insert 11 so that the outer surface of the insert 11 is flush with the outer surface of the inner liner. With this procedure, the maker bonds the insert 11 to the inner lining 21 by fusing the two members together, securing the two together using any suitable adhesive, or securing the two together by any other suitable bonding means.

The manufacturer may also construct the thermoplastic inner liner by first either blow molding or extruding the cylindrical middle portion of the liner and forming an opening in the liner. As shown in FIG. 1C, this opening receives an insert 11a, which the manufacturer bonds in place with adhesive or any other suitable bonding means. This insert 11a like insert 11, increases the thickness of the inner liner in the area where it lies. It has curved or sloping shoulders which abut against the interior curved surface of the inner liner. It also has a central portion which fits into the opening in the inner liner, filling the opening and forming a substantially smooth, curved surface with the outer surface of the liner. The remaining steps of the method are those described in the text below, except, of course, cutting a hole in the inner liner which, in this alternative method already exists.

Another way of constructing the thermoplastic inner liner includes blow molding or extruding the cylindrical middle portion of the inner liner without an opening or recess for the liner. (See FIG. 1D). The manufacturer bonds an insert 11b in place with adhesive or any other suitable bonding means. The maker may even bond the insert 11b to the inner liner 11 during the blow molding process. This insert, like insert 11, increases the thickness of the inner liner in the area where it lies. It has a curved face which abuts against the interior curved surface of the inner liner. The maker can now cut an opening in the inner liner to coincide with the aperture in insert 11b. If insert 11b does not have an aperture then the maker can cut an opening in the inner liner 21 and in the insert 11b. If either of the above approaches is followed, the maker can then place an indicating or marker means in the aperture and begin the step of filament winding the outer shell or layer. The remaining steps of the method are those described in the text below, except, of course, cutting an aperture in the inner liner.

As an alternative, the maker can refrain from cutting an opening in the inner liner and proceed directly to the step of filament winding the outer shell. Of course, the maker can use one or more reinforcing patches placed over the thickened area either during filament winding or after completion of the filament winding. In this alternative, the maker now locates the thickened area and cuts an opening through the reinforced outer shell, the inner liner and through the insert unless, of course, the insert already has an aperture.

After securing the insert and the inner liner together, the maker then removes the tear-away plug 19 from the port 15 as shown in FIG. 3 and replaces it with a finder plug 23 as shown in FIG. 4. The finder plug 23 seals the port 15 during construction of the outer shell 24. It includes a stud 25 which allows the maker to locate the area around the port 15. After inserting the plug 23 in port 15, the maker constructs the composite outer shell 24.

Using the inner liner 21 as a mandrel, the maker winds a glass fiber impregnated with a resin or other suitable material around and over the inner liner 21, over the insert 11 and the plug 23, and around the stud 25. To wind the fibers, the maker may use a machine designed to dispense continuous roving glass fibers impregnated with a resin along a predetermined path. As the glass fiber comes into contact with a blow molded inner liner, it will conform to the shape of the inner liner. After winding the glass filaments to a predetermined thickness, the maker cures the vessel.

During the filament winding process, the maker locates the area of increased thickness and the port 15 by locating the stud 25 of plug 23. The maker then places a securing or reinforcing patch means 27 over this area by puncturing an opening through the reinforcing or securing patch means 27 so that the patch means may engage the surface of the filament winding 24. The reinforcing patch means 27 thus becomes an integral part of the filament wound outer layer or shell 24 (see FIG. 6). If necessary, the maker can add additional reinforcing patches during the filament winding operation at the location of the port 15 over each or a selected number of the glass filament layers which comprise the outer shell.

As an alternative, the maker can place the reinforcing patch means 27 over the layer or shell 24 after completion of the filament winding process. In this situation, the maker punctures an opening through the reinforcing patch 27 so that the patch may engage the surface of the outer shell and, binds the reinforcing patch means to the outer shell 24 using any suitable adhesive. This reinforcing patch means 27 prevents the loosing and unwinding of the glass filaments and distributes the force from cut filaments to uncut filaments once the maker cuts through the outer shell to form a port through the pressure vessel.

The next step comprises cutting through the patch means 27 and the outer composite shell to form an opening through the outer shell (See FIG. 7) and exposing the plug 23. The maker then removes the plug 23 (See FIG. 8) and cuts through the portion of the inner liner 21 blow molded against the port 15. (See FIG. 9)

Thus, the applicants have provided a method for constructing a pressure vessel having a thin thermoplastic inner liner, a filament wound outer shell, and at least one insert which forms a localized area of increased thickness in the sidewall of the thin wall pressure vessel and allows the vessel to have a port through its sidewall. While the disclosure shows a method using a single insert in the sidewall of the cylindrical middle portion of the vessel, one should understand that the maker can use more than one insert and can place these inserts in any desirable pattern in the vessel. This method is simple and economical. It comprises forming an inner liner and bonding at least one insert to it; winding glass filaments impregnated with resin around the liner to form the outer shell; and, after locating the port of the insert, cutting an opening in the outer shell and inner liner at the insert port to form a port through the vessel.

While the applicants have shown the preferred embodiment and alternative embodiments of the invention, one will understand, of course, that the invention is not limited to these embodiments since those skilled in the art to which the invention pertains may make modifications and other embodiments of the principles of this invention, particularly upon considering the foregoing teachings. For example, the manufacturer of the pressure vessel may include more than one area of increased thickness for applications which require more than one port through the sidewall of the pressure vessel. The manufacturer may also form the insert or the inner liner from other materials which have the same characteristics of a thermoplastic material and the manufacturer may form the outer shell of a number of other materials, including the use of metallic dome caps as disclosed in pending application Ser. No. 822,921. Finally, the manufacturer may provide an insert without a port and form the port through the insert when cutting through the outer shell and inner liner and thereafter positioning a fitting in the port. The applicants, therefore, by the appended claims intend to cover any such modifications and other embodiments as to incorporate those features which constitute the essential features of this invention.

What is claimed is:

1. A method of constructing a thin-walled pressure vessel having a localized area of increased wall thickness comprising the steps of: forming a thermoplastic insert having an aperture; forming a thin thermoplastic inner liner having a substantially cylindrical middle portion, first and second end portions connected to said middle portion, and a recess in said middle portion disposed inwardly; securing said insert into said recess to substantially fill the recess and form a substantially smooth and curved surface with the outer surface of said inner liner and form a localized area of increased wall thickness; inserting a locating marker in the aperture of said insert; forming an outer layer substantially covering said insert and said inner liner; securing a reinforcing patch to said outer layer over said locating marker; making an aperture through a portion of said reinforcing patch, said outer layer and said inner liner to complete a port through the localized area of increased wall thickness to the interior of the vessel.

2. A method of constructing a thin walled pressure vessel as set forth in claim 1, wherein the step of securing a reinforcing patch occurs during the step of forming said outer layer.

3. A method of constructing a thin walled pressure vessel as set forth in claim 1, wherein the step of securing said insert into said recess occurs during the formation of said inner liner.

4. A method of constructing a thin-walled pressure vessel having a localized area of increased wall thickness comprising the steps of: forming a thermoplastic insert having an aperture; forming a thermoplastic inner liner having a substantially cylindrical middle portion, first and second end portions connected to said middle portion and a recess in said middle portion disposed inwardly; securing said insert into said recess to substantially fill the recess and form a substantially smooth and curved surface with the outer surface of said inner liner and form a localized area of increased wall thickness; forming an outer layer substantially covering said insert and said inner liner; making an aperture through said outer layer and said inner liner to complete a port through said insert to the interior of the vessel.

5. A method of constructing a pressure vessel as set forth in claim 4 further comprising the step of: positioning a location marker in the aperture of said insert before, forming said outer layer.

6. A method of constructing a pressure vessel as set forth in claim 4 further comprising the step of: securing a reinforcing patch to said outer layer over said localized area of increased thickness during the forming of said outer layer.

7. A method of constructing a pressure vessel as set forth in claim 4 further comprising the step of: securing a reinforcing patch to said outer layer over said localized areas of increased thickness after forming said outer layer.

8. A method of constructing a thin-walled pressure vessel having a localized area of increased wall thickness comprising the steps of: forming a thermoplastic insert having an aperture; forming a thin thermoplastic inner layer having a substantially cylindrical middle portion, first and second end portions connected to said middle portion and an aperture through said middle portion; securing said insert to said inner liner to substantially fill the aperture in said liner and form a substantially smooth and curved surface with the outer surface of said inner liner and form a localized area of increased wall thickness; positioning a location marker proximate said insert; forming an outer layer substantially covering said insert and said inner liner; securing a reinforcing patch to said outer layer proximate said location marker; making an aperture through said outer layer to complete a port through the localized area of increased wall thickness to the interior of the vessel.

9. A method of constructing a thin-walled pressure vessel as set forth in claim 3, wherein the step of securing a reinforcing patch occurs during the step of forming said outer layer.

10. A method of constructing a thin-walled pressure vessel as set forth in claim 4, wherein the step of securing said insert into said recess occurs during the formation of said inner liner.

11. A method of constructing a thin-walled pressure vessel as set forth in claim 5, where the step of securing said insert into said recess occurs during the formation of said inner liner.

12. A method of constructing a thin-walled pressure vessel as set forth in claim 11, further comprising the step of securing a reinforcing patch to said outer layer over said localized area of increased thickness during the step of forming said outer layer.

13. A method of constructing a thin-walled pressure vessel as set forth in claim 5, further comprising the step of securing a reinforcing patch to said outer layer over said localized area of increased thickness during the step of forming said outer layer.

14. A method of constructing a thin-walled pressure vessel as set forth in claim 5, further comprising the step of securing a reinforcing patch to said outer layer over said localized area of increased thickness after forming said outer layer.

15. A method of constructing a thin-walled pressure vessel as set forth in claim 6, wherein the step of securing said insert into said recess occurs during the formation of said inner liner.

16. A method of constructing a thin-walled pressure vessel as set forth in claim 7, wherein the step of securing said insert into said recess occurs during the formation of said inner liner.

17. A method of constructing a thin-walled pressure vessel as set forth in claim 16, further comprising the step of positioning a location marker in the aperture of said insert before forming said outer layer.

18. A method of constructing a thin-walled pressure vessel having a localized area of increased wall thickness comprising the steps of: forming a thermoplastic insert; forming a thin thermoplastic inner liner having a substantially cylindrical middle portion, first and second end portions connected to said middle portion, and a recess in said middle portion, said recess disposed inwardly; securing said insert into said recess to substantially fill the recess and form a substantially smooth and curved surface with the outer surface of said inner liner and form a localized area of increased wall thickness; placing a location marker proximate said insert; forming an outer layer substantially covering said insert and said inner liner; securing a reinforcing patch to said outer layer over said insert; forming an aperture through a portion of said reinforcing patch, said outer layer, said insert and said inner liner to complete a port through the localized area of increased wall thickness to the interior of the vessel.

19. A method of constructing a thin-walled pressure vessel having a localized area of increased wall thickness comprising the steps of: forming a thermoplastic insert with an integral location marker; forming a thin thermoplastic inner liner having a substantially cylindrical middle portion, first and second end portions connected to said middle portion, and a recess in said middle portion, said recess disposed inwardly; securing said insert into said recess to substantially fill the recess and form a substantially smooth and curved surface with the outer surface of said inner liner and form a localized area of increased wall thickness; forming an outer layer substantially covering said insert and said inner liner; securing a reinforcing patch to said outer layer over said insert; forming an aperture through a portion of the reinforcing patch, said outer layer, said insert, and said inner liner to complete a port through the localized area of increased wall thickness to the interior of the vessel.

* * * * *

UNITED STATES PATENT AND TRADEMARK OFFICE
CERTIFICATE OF CORRECTION

PATENT NO. : 4,740,262
DATED : April 26, 1988
INVENTOR(S) : William M. Yavorsky and Gary W. Gauer It is certified that error appears in the above-identified patent and that said Letters Patent is hereby corrected as shown below:

Column 10, add claim 20, as follows:

20. A method of constructing a thin walled pressure vessel having a localized area of increased wall thickness comprising the steps of: forming a thermoplastic insert; forming a thin thermoplastic inner layer having a substantially cylindrical middle portion; securing said insert to the interior surface of said inner liner to form a localized area of increased wall thickness; forming an outer layer substantially covering said inner liner; making an aperture through at least said outer layer to form a port through the localized area of increased wall thickness to the interior of the vessel.

Signed and Sealed this

Twenty-ninth Day of January, 1991

*Attest:*

HARRY F. MANBECK, JR.

*Attesting Officer*              *Commissioner of Patents and Trademarks*